(No Model.)
P. E. MERRIHEW.
CAR WHEEL.
No. 288,469. Patented Nov. 13, 1883.
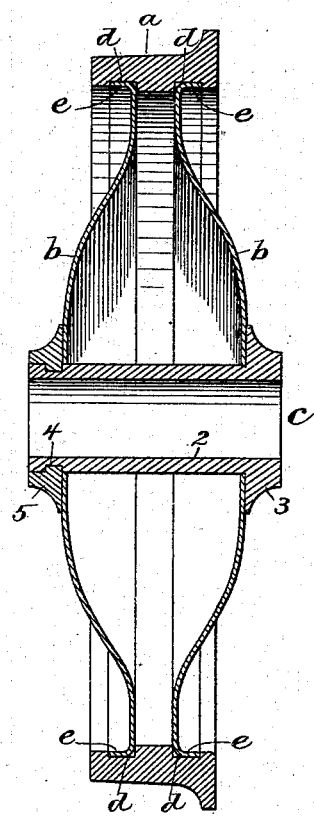

UNITED STATES PATENT OFFICE.

PHINEAS E. MERRIHEW, OF FAIRHAVEN, MASSACHUSETTS.

CAR-WHEEL.

SPECIFICATION forming part of Letters Patent No. 288,469, dated November 13, 1883.

Application filed January 25, 1883. (No model.)

*To all whom it may concern:*

Be it known that I, PHINEAS E. MERRIHEW, of Fairhaven, in the county of Bristol and State of Massachusetts, have invented certain Improvements in Car-Wheels, of which the following is a specification.

This invention consists in a car-wheel composed of a rim or tire having two grooves in its inner surface, two central webs having outwardly-turned flanges fitting in the grooves of the rim, and a hub connecting said webs, the rim and webs being connected by shrinking the rim onto the webs, and thereby effecting a firm and lasting union.

The invention also consists in the construction of the hub, the same being composed of a tube flanged at one end and grooved at the other, inserted in openings formed in said webs, (the flange bearing against the outer surface of one of the webs,) and provided at its other end with a flange bearing against the outer surface of the other web, the last-named flange being secured to the tube by shrinking it into the groove thereof, all of which I will now proceed to describe.

The accompanying drawing, forming a part of this specification, represents a transverse central section of a car-wheel embodying my invention.

In the drawing, $a$ represents the rim or tire, $b$ $b$ the central webs, and $c$ the hub, of my improved wheel. The rim, which is composed of a suitable metal, preferably steel, is provided on its inner surface with two grooves, $d$ $d$, and its outer surface is provided with a flange at one edge, as usual. The webs $b$ $b$, which are also of metal, are each of a dish or concavo-convex form, and each is provided with a marginal flange, $e$, bent outwardly from its convex surface. The flanges $e$ $e$ are formed to fit exactly in the grooves $d$ $d$, as shown in the drawing, when the rim is in its normal condition or at an ordinary temperature; but the inner diameter of the rim outside of the grooves $d$ $d$ is such that when the rim is expanded by a sufficient degree of heat, the webs can enter the rim, so that their flanges will coincide with the grooves $d$ $d$, and will be caused to fit tightly in said grooves by the cooling and contraction of the rim. The portion of the inner surface of the rim between the grooves $d$ $d$ is preferably extended toward the center of the wheel farther than the portions outside of said grooves, so that the inner walls of the grooves will be sufficiently deep to form rests for the inner edges of the webs when the rim is expanded, and thus enable the flanges of the webs to coincide readily with the grooves of the rim.

From the foregoing it will be obvious that the rim and webs are united by first heating and expanding the rim, then placing the webs in their proper position in the rim, and allowing the latter to shrink onto the flanges of the webs, a firm and intimate union being thus effected.

The hub $c$ is composed of a tube of metal, 2, having at one end a flange, 3, and at the other end a peripheral groove, 4, and a flange, 5, secured to the grooved end, as hereinafter described, after the tube 2 is in place. The webs $b$ $b$ are provided with central orifices receiving the tube 2, the flange 3 thereof bearing against the outer side of one of the webs, and the grooved end projecting through the other web. The flange 5 is composed of a metal ring or collar the inner surface of which is adapted, when cold, to fit closely the grooved end of the tube 2. Said flange is expanded by heat preparatory to its application to the tube, and is then slipped onto the grooved end of the tube and allowed to shrink into the groove thereof, so that it is firmly united to the tube, and bears against the outer surface of the web, through which the grooved end of the tube projects.

It will be seen that the outwardly-turned flanges $e$ $e$ give the webs sufficiently wide bearings on the rim $a$, and enable the webs to be made so thin as to be somewhat elastic. The dish-form of the webs also contributes to their elasticity. I prefer to form the webs by spinning them up from flat disks of sheet or thin plate metal, although, if desired, they may be cast, dropped, or wrought.

I lay no claim, broadly, to shrinking a grooved tire onto a wheel, nor to a car-wheel having flanged webs fitting into an internally-grooved rim, the parts being held together by bolts.

I do not here claim the process of manufacture herein described, but reserve for separate applications for Letters Patent all patentable features set forth but not hereinafter specifically claimed.

I am aware that it is not new in the manufacture of car-wheels to shrink an internally-grooved rim onto flanged webs, and subsequently to give the parts their proper form and hold them together by welding them under a white heat; but my invention differs from that method in producing a completed wheel, the grooved rim of which is held to the flanged webs by shrinking without welding.

I claim—

1. The improved car-wheel, composed of the flanged webs connected by a suitable hub, and the separate internally-grooved rim shrunk and having its bearings directly upon the flanges of said webs, as set forth.

2. The improved car-wheel, composed of the elastic dish-shaped flanged webs, connected by a suitable hub, and the separate internally-grooved rim shrunk and having direct bearing upon the flanges of said webs, as set forth.

3. The combination, with the webs, of the hub composed of the tube flanged at one end and grooved at the other, and the flange shrunk upon the grooved end of the tube, as set forth.

In testimony whereof I have signed my name to this specification, in the presence of two subscribing witnesses, this 22d day of January, 1883.

PHINEAS E. MERRIHEW.

Witnesses:
A. L. WHITE,
C. P. JUDD.